(12) United States Patent
Kram et al.

(10) Patent No.: US 9,749,041 B2
(45) Date of Patent: Aug. 29, 2017

(54) SYSTEM AND METHOD USING FAULT INJECTION INTO LINE MONITORING SYSTEM BASELINES

(75) Inventors: Richard Kram, Ocean, NJ (US); Jonathan M. Liss, Marlboro, NJ (US); Yuriy Tsaltskan, Morganville, NJ (US)

(73) Assignee: TYCO ELECTRONICS SUBSEA COMMUNICATIONS LLC, Morristown, NJ (US)

(*) Notice: Subject to any disclaimer, the term of this patent is extended or adjusted under 35 U.S.C. 154(b) by 74 days.

(21) Appl. No.: 13/303,810

(22) Filed: Nov. 23, 2011

(65) Prior Publication Data
US 2013/0129343 A1 May 23, 2013

(51) Int. Cl.
*H04B 17/00* (2015.01)
*H04B 10/077* (2013.01)

(52) U.S. Cl.
CPC .................... *H04B 10/0773* (2013.01)

(58) Field of Classification Search
None
See application file for complete search history.

(56) References Cited

U.S. PATENT DOCUMENTS

| | | | | |
|---|---|---|---|---|
| 5,790,289 A * | 8/1998 | Taga et al. | | 398/79 |
| 6,134,032 A * | 10/2000 | Kram et al. | | 398/17 |
| 6,323,981 B1 * | 11/2001 | Jensen | | 398/11 |
| 6,404,527 B1 * | 6/2002 | Jensen | | 398/177 |
| 6,414,775 B1 * | 7/2002 | Pedersen | | 398/177 |
| 7,426,617 B2 | 9/2008 | Stager et al. | | |
| 7,809,279 B2 | 10/2010 | Zhang et al. | | |
| 2003/0052253 A1 * | 3/2003 | Johnson | | 250/216 |
| 2005/0091482 A1 * | 4/2005 | Gray | | H04L 41/5058 713/151 |
| 2007/0041006 A1 * | 2/2007 | Abbott | | 356/73.1 |
| 2008/0075457 A1 | 3/2008 | Skoog et al. | | |
| 2008/0122617 A1 * | 5/2008 | Browning | | G02B 6/4416 340/541 |
| 2009/0028550 A1 * | 1/2009 | Zhang et al. | | 398/16 |
| 2009/0202237 A1 * | 8/2009 | Zhang et al. | | 398/6 |
| 2009/0324249 A1 * | 12/2009 | Zhang | | 398/177 |

FOREIGN PATENT DOCUMENTS

| | | |
|---|---|---|
| CN | 1668032 | 9/2005 |
| CN | 102100018 A | 6/2011 |
| CN | 102122989 | 7/2011 |
| EP | 1294111 A2 | 3/2003 |
| EP | 1758279 A1 | 2/2007 |
| WO | 0060773 A1 | 10/2000 |

OTHER PUBLICATIONS

International Search Report and Written Opinion dated Mar. 18, 2013 issued in related International patent Application No. PCT/US2012/064271.
Chinese Office Action issued on Oct. 29, 2015 in corresponding Chinese Patent Application Serial No. 201280057410.9.

* cited by examiner

Primary Examiner — Ken N Vanderpuye
Assistant Examiner — David Lambert (57) ABSTRACT

A system and method for establishing new line monitoring system (LMS) baseline data compared to which faults are identified in a line monitoring system of an optical communication system. The new LMS baseline is established by injecting fault signature data associated with previous unrepaired faults into LMS current measurement loop gain data.

17 Claims, 3 Drawing Sheets

Loop Back Path (Repeater) Number

Obtaining LMS current measurement loop gain data representative of gain imparted to a test signal through each of a plurality of loop back paths of the system, each of the loop back paths coupling a first fiber optic path for carrying signals in a first direction and a second fiber optic path for carrying signals in a second direction opposite to the first direction
— 502

Modifying the LMS current measurement loop gain data with data representative of a fault signature associated with a previous fault identified in the system prior to the change to establish the new LMS baseline data
— 504

FIG. 5

SYSTEM AND METHOD USING FAULT INJECTION INTO LINE MONITORING SYSTEM BASELINES

TECHNICAL FIELD

The present application relates to optical communication systems and, more particularly, to a system and method using fault injection into line monitoring system baselines.

BACKGROUND

In long distance optical communication systems it may be important to monitor the health of the system. For example, monitoring can be used to detect faults or breaks in the optical transmission cable, faulty repeaters or amplifiers or other problems with the system.

Known monitoring techniques include use of a line monitoring system (LMS) including a network of loop back paths, e.g. high-loss loop back (HLLB) paths, within the system amplifiers/repeaters and/or other network equipment and line monitoring equipment (LME) that generates a test signal representing a pseudo random bit sequence. The LME may transmit the test signal with the information signals, e.g. in wavelength division multiplexed system. The test signal may be returned to the LME through the HLLB paths. The LME may include hardware and software components that separate the returned test signal from the data signals, and process the returned test signal to obtain data representing the HLLB loop gain imparted to the test signal in its propagation from the line monitoring equipment, through the HLLB and any intervening optical paths and amplifiers, and back to the LME. Significant deviations in HLLB loop gain may indicate a fault in the system.

A fundamental data set used by the LMS to determine if a system fault has occurred, e.g. in the optical fiber, repeaters, branching unit, etc., is the LMS baseline. In particular, an LMS baseline is a control measurement of gain data from each of the loop back paths made before the system goes into operation or before occurrence of faults or degradations in the system against which current measurements are compared to determine if new faults or degradations have occurred in the system.

Faults may be detected by the LMS using an Automatic Signature Analysis (ASA) algorithm. In general, ASA algorithms use gain data (e.g. differential gain data) of the LMS baseline versus gain data of a current measurement compared against a set of stored gain signatures to determine what fault may be present. One example of a system incorporating ASA is described in commonly owned U.S. Pat. No. 7,809,279, the teachings of which are hereby incorporated herein by reference.

Under certain conditions, such as after a system repair or if a system upgrade occurs that changes terminal line characteristics, the LMS baseline should be reset to a new LMS baseline measurement, i.e. the system should be "re-baselined." Future measurements are compared to the new LMS baseline. Unfortunately, once a new LMS baseline is established any faults or degradations that may have been reported in comparison to the old LMS baseline will disappear as they will not be visible as compared to the new LMS baseline. Only new faults that occur after the new LMS baseline has been set will be detected by the ASA algorithms of the LMS.

BRIEF DESCRIPTION OF THE DRAWINGS

Reference should be made to the following detailed description which should be read in conjunction with the following figures, wherein like numerals represent like parts.

DETAILED DESCRIPTION

A system and method consistent with the present disclosure includes injecting previous faults identified relative to a previous LMS baseline into a new LMS baseline so that the previous faults may be identified with respect to the new LMS baseline. In one embodiment, the inverse of the last known fault signature set may be injected into the current baseline so that fault detection with the new baseline may be accomplished using the same fault signature set associated with the previous baseline. Detection of previous faults and new faults in such an embodiment may thus be achieved relative to a new baseline without changes to the fault signature set associated with the previous faults.

Figure 1:
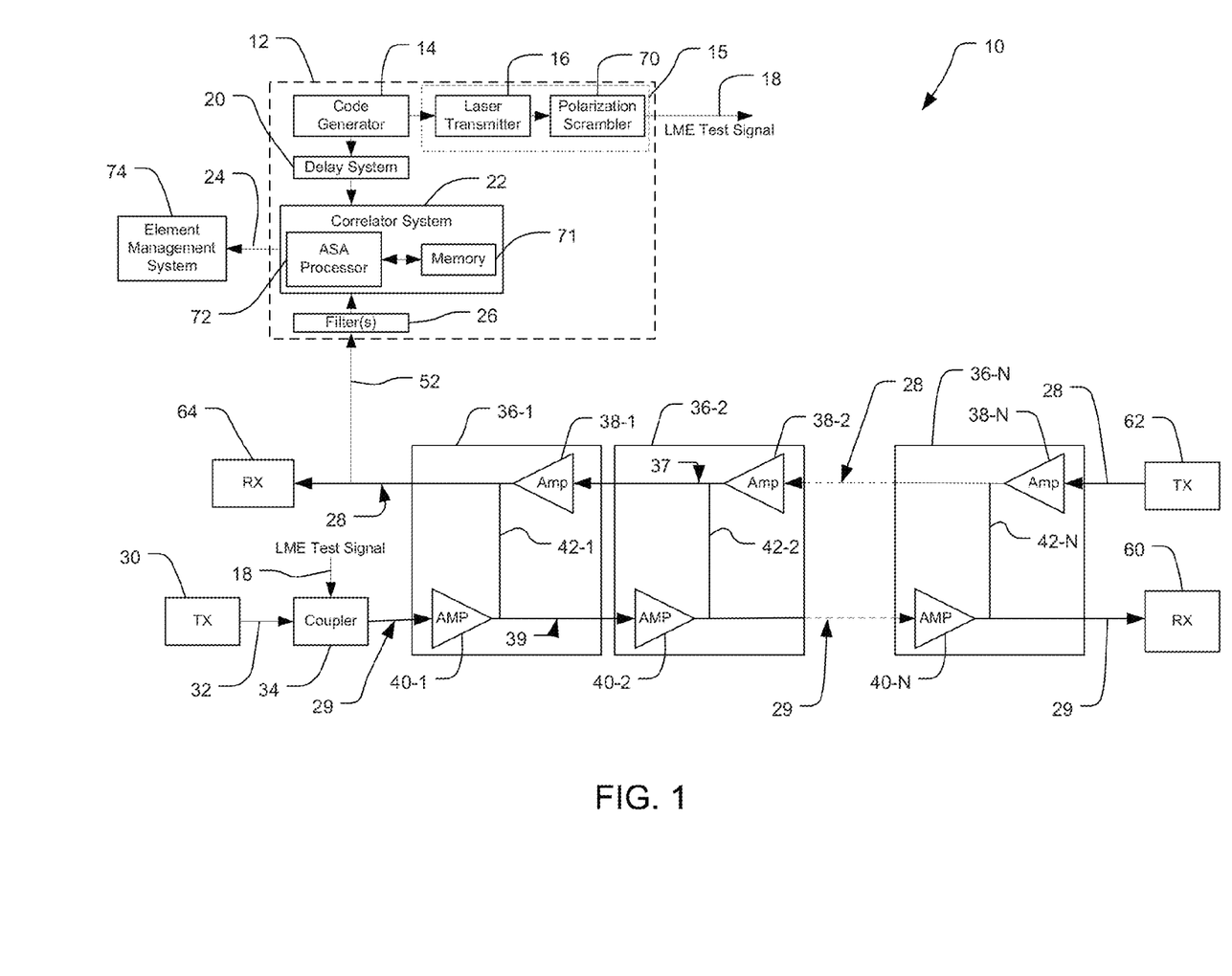
FIG. 1 is a simplified block diagram of one exemplary embodiment of a system consistent with the present disclosure.

FIG. 1 is a simplified block diagram of one exemplary embodiment of a WDM transmission system 10 including a line monitoring system consistent with the present disclosure which includes line monitoring equipment (LME) 12 and loop back paths 42-1, 42-2 . . . 42-N. In general, the system 10 may be configured to calculate a loop gain value associated with each repeater/loop back path. Variation in the loop gain may be used to generate a system alarm indicating a fault in the system. An automated signature analysis (ASA) algorithm may be applied to the loop gain to identify the nature of the fault.

The term loop gain as used herein refers to the gain imparted to an LME test signal along the path from the LME through an associated loop back path and back to the LME, or along any portion of such path. The loop gain along the portion of the path between adjacent loop back paths is referred to herein as differential loop gain. Embodiments will be described herein as using differential loop gain. In general differential loop gain may be calculated as the gain imparted to an LME test signal along the path from the LME through a first loop back path and back to the LME minus the gain imparted to the LME test signal along the path from the LME through the loop back path immediately preceding the first loop back path and back to the LME.

Those of ordinary skill in the art will recognize that the system 10 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

In the illustrated exemplary embodiment, the transmission system 10 includes a laser transmitter 30 and an optical fiber pair, including fibers 28 and 29, for carrying optical signals. Fibers 28 and 29 may be long distance optical fiber lines for deployment, for example, in and/or across a body of water. The portion of the system disposed in a body of water, e.g. an ocean, may be referred to herein as the "wet plant."

The optical fibers 28 and 29 may be unidirectional fibers and carry signals in opposite directions. Fibers 28 and 29 together establish a bidirectional path for transmitting signals. While the illustrated exemplary monitoring system may be described as monitoring a transmission system including two unidirectional fibers 28 and 29, a system consistent with the present disclosure may be used to monitor transmission systems employing a single bidirectional fiber.

The laser transmitter 30 may be a wavelength-division multiplexing (WDM) transmitter configured to transmit optical data on a plurality of channels (or wavelengths) over fiber 29 to a WDM receiver 60. The transmitter and receiver, of course, are shown in highly simplified form for ease of explanation. Laser transmitter 30 may include a plurality of laser transmitters each transmitting an optical data signal using a different channel or wavelength, and a multiplexer for combining the data signals into an aggregate signal transmitted over fiber 29. The receiver may demultiplex and detect the transmitted data signals. Similarly, WDM data signals may be transmitted over the fiber 28 from a transmitter 62 to a receiver 64, i.e. in a direction opposite of those signals on fiber 29. Alternatively, only a single channel of data may be carried on fibers 28 and/or 29.

The line monitoring equipment (LME) 12 may be configured for monitoring the health of the system 10, and may be provided in a variety of configurations. In the illustrated exemplary embodiment, the LME 12 includes a code generator 14, a test signal transmitter 15 including a laser transmitter 16 and a polarization scrambler 70, a delay system 20, a correlator system 22 including an ASA processor 72 and computer readable memory, and a filter 26. The LME 12 may be configured to provide an output 24, e.g. an alarm, to an element management system 74 when a fault is detected in the system 10.

The code generator 14 may be configured for generating and outputting a test code, such as a pseudo-random sequence (PRS) of code. A variety of code generator and code configurations are known to those of ordinary skill in the art. The output of the code generator 14 may be coupled to the laser transmitter 16. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The laser transmitter 16 may take a known configuration, e.g. a distributed feedback laser (DFB), and may be configured to produce an optical output at a carrier wavelength 4 that may be different from the wavelengths of all of the data channels to be transmitted on the transmission system. The carrier wavelength $\lambda_0$ may, for example, by at an edge of the spectral bandwidth of the system or may be between data channels. In one embodiment, the laser transmitter may be configured to provide an optical output at a plurality of different carrier wavelengths. For example, the laser transmitter may provide an output at a short LME wavelength at the short wavelength end of the data signal transmission band, i.e. adjacent the shortest wavelength data channel, and a long LME wavelength at the long wavelength end of the data signal transmission band, i.e. adjacent the longest wavelength data channel. In one embodiment, the short LME wavelength may be 1537 nm and the long LME wavelength may be 1563 nm. The power of the laser output may be set below the power level of the data signals communicated over fibers 28 and 29 to minimize the impairment of the data signals.

The laser transmitter 16 may generate an LME test signal, e.g. on both the long and short LME wavelengths, representative of the code received from code generator 14. The LME test signal may be provided as an LME test signal output 18 of the test signal transmitter 15. In one embodiment, the output of the code generator may directly modulate the amplitude of the laser output. Other configurations for imparting the code to the output light from the laser transmitter are known. For example, the code may be imparted by an amplitude or other modulator coupled to an output of the laser transmitter 16.

In the illustrated exemplary embodiment an optional polarization scrambler 70 is coupled to the laser transmitter 16 for scrambling the polarization of the LME test signal. The polarization scrambler may take a known configuration. In one embodiment, the polarization scrambler 70 may alter the state of polarization of the LME test signal in such a way that the average value of the state of polarization over a polarization modulation period is reduced from unity. Accordingly, the LME test signal output 18 of the test signal transmitter 15 may have a degree of polarization substantially equal to zero and may be considered polarization scrambled.

In the illustrated exemplary embodiment, a coupler 34 may combine the WDM data 32 from transmitter 30 and LME test signal 18 and output this combined signal for transmission onto fiber 29. A plurality of optical repeaters 36-1, 36-2 . . . 36-N may be coupled to the optical fibers 28 and 29. Each repeater may include a first amplifier 40-1, 40-2 . . . 40-N, respectively, for amplifying optical signals transmitted over fiber 29 to receiver 60, and a second amplifier 38-1, 38-2 . . . 38-N, respectively, for amplifying optical signals transmitted over fiber 28 to receiver 64. Each repeater may also include an associated loop back path 42-1, 42-2 . . . 42-N, e.g. a high loss loop back path, which returns a portion of the signal transmitted on fiber 29 to fiber 28 for transmission to LME 12.

Signal 52 may be coupled to the filter 26, and may carry all signals present on fiber 28, including the combined WDM data 32 and LME test signals 18 returned by loop back paths 42-1, 42-2 . . . 42-N over fiber 28. Filter 26 may be wavelength selective and pass only the wavelengths of the returned LME test signal 18 to the correlator 22.

The LME test signals returned to LME 12 by each repeater via fiber 28 are delayed from the original LME test signal 18 by a time period proportional to the distance of the delay path for each repeater. For the first repeater 36-1, for example, the time delay $t_{s1}$ is proportional to the distance of the delay path through the first repeater 36-1. The distance $d_1$ through the first repeater may be calculated as the distance from the code generator 14, to transmitter 16, polarization scrambler 70, to coupler 34, to the first repeater 36-1, through loop back path 42-1, to the optical filter 26, and to the correlator 22. The time delay $t_{s1}$ for the LME test signal returned by the first repeater 36-1 may therefore be calculated as $t_{s1}=d_1/c$, where c is the speed of light. Similarly, the time delay $t_{s2}$ for the LME test signal returned by the second repeater 36-2 can be calculated based on the known distance, $d_2$, of the delay path for the second repeater 36-2, and may be calculated as $t_{s2}=d_2/c$. Likewise, time delays for additional repeaters in the system can also be calculated based on the known distances of their delay paths.

To facilitate a correlation operation by the correlator 22, delay system 20 may receive the transmitted codes from code generator 14 and output a plurality of associated delayed codes to correlator 22. Delay system 20 may output each code after the time delays corresponding to each repeater, i.e., $t_{s1}$ (corresponding to time delay for the first repeater 36), $t_{s2}$ (corresponding to the time delay for the second repeater 44), etc. In other words, delay system 20 may delay the codes based on the location of each repeater.

The correlator 22 may then correlate the returned LME test signal with delayed codes from the delay system 20. The correlator 22 may correlate electrical signals or optical signals. Where the correlator 22 correlates electrical signals, LME 12 may further include an optical-to-electrical converter connected between filter 26 and the correlator 22 for converting the optical signals output by filter 26 into electrical signals.

In the correlation operation, correlator 22 may be configured calculate loop gain data associated with each repeater 36-1, 36-2 . . . 36-N/loop back path 42-1, 42-2 . . . 42-N. For ease of explanation in connection with FIG. 1, reference herein may be made to loop gain associated with each repeater. It is to be understood that the loop back paths may be provided in any component coupled to the system, e.g. in a repeater, branching unit, etc., and loop gain may be calculated with respect to each loop back path regardless of the component providing the loop back path.

The loop gain data for each repeater may be calculated by comparing the returned LME test signal received from the repeater with the associated delayed test code. In the illustrated exemplary embodiment, the loop gain for any repeater 36-i may represent the gain and the loss imparted to the test signal from the code generator 14, to transmitter 16, to polarization scrambler 70, to coupler 34, to the repeater 36-i, through loop back path 42-i, to the optical filter 26, and to correlator 22.

In one embodiment, the correlator 22 may be configured to convert loop gain data associated with each repeater to differential loop gain data associated with each repeater 36-1, 36-2 . . . 36-N. The differential loop gain for each repeater 36-i, may be calculated as the loop gain associated with repeater 36-i, minus the loop gain associated with the repeater 36-(i-1) immediately preceding the repeater 36-i. For example, the differential loop gain associated with repeater 36-2 may be calculated as the loop gain for repeater 36-2, minus the loop gain for repeater 36-1. In the illustrated exemplary embodiment, since loss associated with the HLLB paths of successive repeaters may essentially cancel each other, the differential loop gain associated with repeater 36-2 may essentially represent the gain imparted to the test signal by amplifiers 40-2 and 38-1, minus the loss imparted to the test signal on paths 39 and 37.

Differential loop gain may thus rely on only four random variables, i.e. two gain variables and two loss variables. Compared to simple loop gain, therefore, differential loop gain may exhibit a relatively small maximum/minimum deviation due to normal system fluctuations, and may not be particularly susceptible to distance. These factors may allow setting of a reliable gain variation threshold at which a fault detection trigger may be set.

In the illustrated exemplary embodiment the correlator 22 includes an ASA processor 72 and a computer readable memory 71. The ASA processor 72 may be configured to apply one or more ASA algorithms to the differential loop gain data calculated by the correlator 22 to characterize the type of fault occurring in the transmission system 10. In general, the ASA process uses an LMS baseline data versus a current measurement of loop gain data compared against a set of stored (e.g. in memory 71) fault signatures to determine what fault(s) may be present in the system. The ASA process may be triggered by an alarm generated when differential loop gain in a repeater exceeds a predetermined differential loop gain variation threshold. As a result of the ASA process, the correlator may provide an output 24 to an element management system 74 indicating the type of fault.

The ASA algorithms may take a variety of configurations and may be implemented as one or more computer programs or applications, for example, running on a computer system such as the ASA processor 72. Computer programs or applications, such as the ASA algorithms, may be stored on memory 71, or other machine readable medium (e.g., a hard disk, a CD Rom, a system memory, optical memory, etc.) and may be executed by a processor, such as the ASA processor 74, to cause the processor to perform all or part of the functions described herein as being performed by the correlator 22. It is expected that such a computer program product may be distributed as a removable non-transitory machine-readable medium (e.g., a diskette, CD-ROM), preloaded with a system (e.g., on system ROM or fixed disk), or distributed from a server or electronic bulletin board over a network (e.g., the Internet or World Wide Web). Those of ordinary skill in the art will recognize that the correlator functionality may be implemented using any combination of hardware, software, and/or firmware to provide such functionality.

In one embodiment, the ASA processor 72 may be configured to compare current differential loop gain data with predetermined differential loop gain fault signatures corresponding to differential loop gain resulting from faults in the optical communication system. The comparison of differential loop gain data with the predetermined differential loop gain fault signatures may be performed using known signal processing techniques, such as matched filters. Predetermined fault signatures may be established for system faults such as extra pump loss, and extra fiber loss. Extra pump loss may be characterized by complete or partial failure of amplifier pump lasers within a repeater. Extra fiber loss may occur and may be characterized by additional or complete loss of transmission through the fiber path, e.g. in path between amplifiers 40-1 and 40-2 in FIG. 1. Examples of signatures associated with extra pump loss and extra fiber loss may be found in the aforementioned U.S. Pat. No. 7,809,279 which is incorporated herein by reference. Of course, other faults may be detected and examined.

Figure 2:
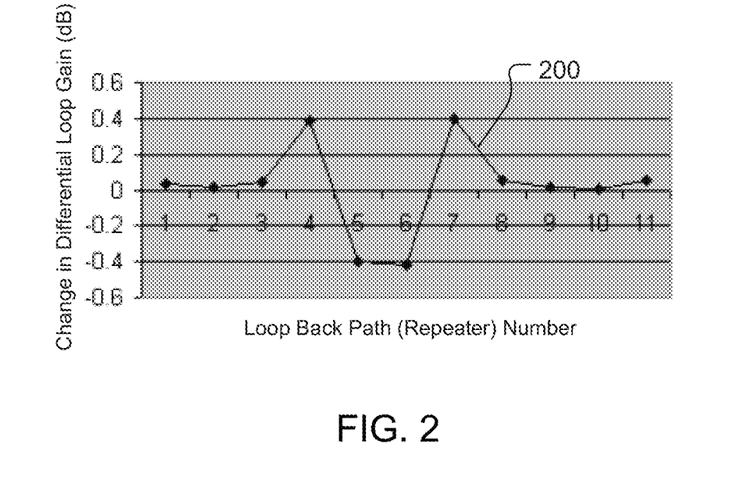
FIG. 2 includes a plot of change in differential loop gain vs. loop back path number associated with extra pump loss in an exemplary system consistent with the present disclosure.
Figure 3:
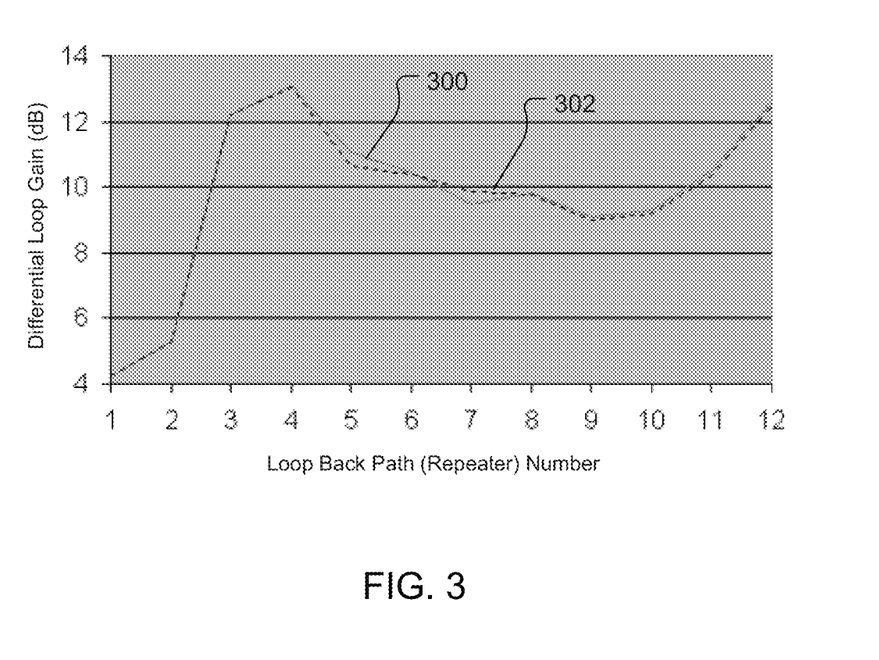
FIG. 3 includes plots of loop gain vs. repeater loop back number associated with an LMS current measurement and a new LMS baseline established by modifying the LMS current measurement with a fault signature associated with a previous fault consistent with the present disclosure.
Figure 4:
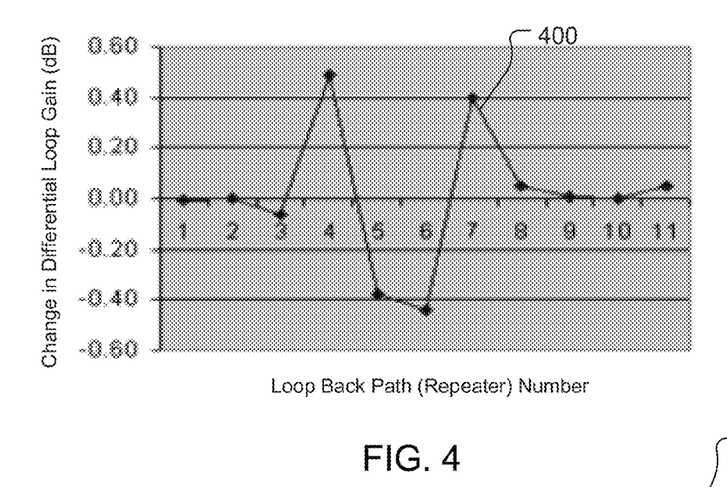
FIG. 4 includes a plot of change in differential loop gain vs. loop back path number calculated using a new LMS baseline and identifying a previous extra pump loss fault consistent with the present disclosure.

Consistent with the present disclosure, the correlator system 22 of the system 10 may be configured to inject previous faults identified relative to a previous LMS baseline into a new LMS baseline when a new LMS baseline is established, e.g. after a change to the system or upon the request of a user through a user interface coupled to the element management system 74. FIGS. 2-4 and Tables 1-2 illustrate one embodiment of the operation of the system 10, e.g. of the correlator system 22, to inject previous faults into a new LMS baseline. The plots set forth in FIGS. 2-4 and the values given in Tables 1-2 are provided by way of explanation only. Plots and measurement values for any given system will depend upon the system configuration.

Table 1 below illustrates exemplary measurements associated with detection of one or more initial faults in a system operating with an LMS baseline, i.e. before a subsequent re-baselining of the system. Table 1 includes an LMS Baseline Measurement (column A) and an LMS current measurement (column C) associated with each of twelve different loop back paths, i.e. each measurement represents the gain of an LME test signal from the LME, e.g. LME 12 in FIG. 1, through the indicated loop back path, and back to the LME. The loop back paths are numbered consecutively in Tables 1-2, i.e. loop back path 1 is the first loop back path in the transmission direction, e.g. loop back path 42-1 in FIG. 1, and loop back path 2 is the next loop back path in the transmission direction, e.g. loop back path 42-2 in FIG. 1. The LMS Baseline Measurement may be an initial baseline for the system or a previous re-baseline of the system, and indicates performance of the system with no faults, or with previously injected faults in the case of the LMS baseline being a previous re-baseline of the system. The LMS current Measurement in Table 1 is a measurement made after the LMS Baseline Measurement is established and indicates one or more faults in the system under test.

The LMS Current Measurement data set in column C including one or more faults when compared against the LMS Baseline may be expressed as:

$$M=\{m_1, m_2, \ldots, m_n\} \qquad \text{Equation 2}$$

The Differential Baseline data set in column B may be expressed as:

$$D(B)=\{0, b_2-b_1, b_3-b_2, \ldots, b_n-b_{n-1}\} \qquad \text{Equation 3}$$

The Differential Current Measurement data set in column D may be expressed as:

$$D(M)=\{0, m_2-m_1, m_3-m_2, \ldots, m_n-m_{n-1}\} \qquad \text{Equation 4}$$

The Differential Delta data set in column E may be expressed as:

$$\Delta(M)=D(M)-D(B) \qquad \text{Equation 5}$$

FIG. 2 includes a plot 200 of the Differential Delta data set in column E of Table 1 vs. the loop back path number providing a visual indication of the fault signature indicated by the values in Column E. When one or more fault(s) are present in the system as indicated in FIG. 2, the plot 200

TABLE 1

Initial Fault Signature Detection

| Loop back Path/Index | A<br>LMS Baseline Measurement | B<br>Differential Baseline | C<br>LMS Current Measurement | D<br>Differential Current Measurement | E<br>Differential Current Measurement Minus Differential Baseline Differential Delta Data |
|---|---|---|---|---|---|
| 1 | 4.24 | | 4.24 | | |
| 2 | 5.31 | 1.07 | 5.34 | 1.10 | 0.03 |
| 3 | 12.23 | 6.92 | 12.27 | 6.93 | 0.01 |
| 4 | 13.11 | 0.88 | 13.19 | 0.92 | 0.04 |
| 5 | 11.07 | −2.04 | 11.54 | −1.65 | 0.39 |
| 6 | 10.45 | −0.62 | 10.52 | −1.02 | −0.40 |
| 7 | 9.47 | −0.98 | 9.12 | −1.40 | −0.42 |
| 8 | 9.82 | 0.35 | 9.87 | 0.75 | 0.40 |
| 9 | 9.09 | −0.73 | 9.19 | −0.68 | 0.05 |
| 10 | 9.29 | 0.2 | 9.4 | 0.21 | 0.01 |
| 11 | 10.47 | 1.18 | 10.58 | 1.18 | 0.00 |
| 12 | 12.62 | 2.15 | 12.78 | 2.20 | 0.05 |

The values in columns B, D and E in Table 1 are calculated, e.g. in the correlator system 22 of FIG. 1, from the LMS Baseline Measurement in column A and LMS Current Measurement in column C. In particular, in the illustrated embodiment, the LMS Baseline data in column A is converted to a Differential Baseline data set in column B by subtracting each data item from the one before it starting with the second data item, i.e. column B[X]=Column A[X]−Column A[X−1], where X is the loop back path number.

The same operation is performed on the LMS Current Measurement in column C to create a Differential Current Measurement data set in column D, i.e. column D[X]=Column C[X]−Column C[X−1], where X is the loop back path number. The Differential Baseline data set is then subtracted from the Differential Current Measurement data set to provide a Differential Delta data set in column E, i.e. column E[X]=Column D[X]−Column B[X], where X is the loop back path number. In the ASA process, the Differential Delta data set is compared against a stored set of differential delta fault signatures to identify faults in the system.

In general, in the example set forth in Table 1 the LMS Baseline data set in column A may be expressed as:

$$B=\{b_1, b_2, \ldots, b_n\}, \text{ where } n \text{ is the loop back path number.} \qquad \text{Equation 1}$$

displays a known and predictable shape that may be compared against a stored fault signature in an ASA algorithm for determining the nature of the fault. The fault signature illustrated in FIG. 2, for example, may represent and optical amplifier pump failure, e.g. extra pump loss. In contrast, if the LMS Current Measurement were taken with no faults present in the system, the plot 200 would be a relatively straight line around the 0 dB value since the LMS Current Measurement and LMS Baseline Measurement would track each other very closely. Deviations from the 0 dB value in such a case may be due to noise and data round off.

When changes, such as repairs or upgrades, are made to the system the LMS baseline used prior to such changes may no longer represent the loop gain of the system when the system is without new faults. To account for such changes, a new LMS baseline for the system may be established after the changes are made, i.e. the system may be "re-baselined." One known approach to establishing a new LMS baseline is to simply substitute current measurement of LMS gain data for the existing LMS baseline. If the system, e.g. system 10, did not include any unrepaired previous faults prior to the performing the current measurement of LMS gain data, this approach would establish a new reliable LMS baseline that accounts for the system changes. However, when the system includes unrepaired previous faults, the unrepaired previous faults would not be detected relative to a new LMS baseline established by simply substituting a current measurement of LMS gain data for the existing LMS baseline.

In a system and method consistent with the present disclosure, a new LMS baseline is established for a system by injecting a fault signature data set associated with an unrepaired previous fault and detected with respect to a previous LMS baseline into a current measurement of LMS gain data. The fault signature data may be injected into the current measurement of LMS gain data by modifying a current measurement of LMS gain data with the fault signature data in any deterministic manner, e.g. by adding or subtracting values representative of the fault signature data from the current measurement of LMS gain data.

FIG. 3 and Table 2 illustrate one embodiment consistent with the present disclosure wherein values representative of an inverse of a fault signature data set detected with respect to a previous LMS baseline are injected into a current measurement of LMS data to establish a new LMS baseline. With this approach, fault detection relative to the new LMS baseline may be made using the same fault signature set associated with the previous LMS baseline. Detection of unrepaired previous faults and new faults in such an embodiment may thus be achieved relative to a new LMS baseline without changes to the fault signature set associated with the previous faults and previous LMS baseline.

For example, if the system described above with reference to Table 1 is to be re-baselined after changes thereto but prior to repair of the fault indicated by the Differential Delta data in column E thereof (and represented graphically in FIG. 2), the fault indicated by the Differential Delta data in column E would be an unrepaired previous fault that would be injected into the new LMS baseline when re-baselining the system. Of course, if the fault indicated by the Differential Delta data in column E was repaired prior to re-baselining, it would not be necessary to inject such fault into the new LMS baseline.

Consistent with one embodiment of the present disclosure, to re-baseline the system the LME may take the Differential Delta data associated with a previously unrepaired fault, e.g. the data in column E of Table 1 in the present example, and map it into equivalent gain changes relative to an LMS current measurement. The system may then inject those gain changes into the LMS current measurement data set so that subsequent Differential Delta calculations provides an expected fault signature associated with the unrepaired previous fault within the bounds of expected LME measurement-to-measurement gain variation. The LME hardware measures gain changes in the system. The gain changes measured by the LME may be referred to herein as "raw" gain changes.

Table 2, for example, illustrates one example of a fault injection computation consistent with the present disclosure:

TABLE 2

Fault Injection Computation Table

| A<br>Loop<br>back<br>Path/<br>Index | B<br>LMS<br>Current<br>Measurement | C<br>New LMS<br>Baseline<br>With<br>Injected<br>Fault | D<br>Differential<br>Delta | E<br>Diff Δ<br>Fault<br>Pattern | F<br>Normalized<br>Fault<br>Data Set |
|---|---|---|---|---|---|
| 1 | 4.24 | 4.24 | 0.00 | 0 | 0.00 |
| 2 | 5.31 | 5.31 | 0.03 | 0 | 0.00 |

TABLE 2-continued

Fault Injection Computation Table

| A<br>Loop<br>back<br>Path/<br>Index | B<br>LMS<br>Current<br>Measurement | C<br>New LMS<br>Baseline<br>With<br>Injected<br>Fault | D<br>Differential<br>Delta | E<br>Diff Δ<br>Fault<br>Pattern | F<br>Normalized<br>Fault<br>Data Set |
|---|---|---|---|---|---|
| 3 | 12.24 | 12.23 | 0.01 | 0.01 | 0.01 |
| 4 | 13.11 | 13.06 | 0.04 | 0.04 | 0.05 |
| 5 | 11.09 | 10.65 | 0.39 | 0.39 | 0.44 |
| 6 | 10.45 | 10.41 | −0.40 | −0.40 | 0.04 |
| 7 | 9.5 | 9.88 | −0.42 | −0.42 | −0.38 |
| 8 | 9.82 | 9.80 | 0.40 | 0.40 | 0.02 |
| 9 | 9.09 | 9.02 | 0.05 | 0.05 | 0.07 |
| 10 | 9.3 | 9.27 | 0.01 | 0 | 0.07 |
| 11 | 10.47 | 10.40 | 0.00 | 0 | 0.07 |
| 12 | 12.62 | 12.55 | 0.05 | 0 | 0.07 |

Column D of Table 2 is the Differential Delta data set associated with the unrepaired previous fault in this example, i.e. the Differential Delta data set from column E of Table 1. For each unrepaired previous fault, a fault pattern is identified in the Differential Delta data set for injection into the new baseline. The Differential Delta Fault Pattern (column E of Table 2) to inject into the baseline may be, for example, locations in Deferential Delta data between which the Differential Delta data exceeds a zero value by some predetermined threshold amount. For example, the Differential Delta Fault Pattern to be injected into the new baseline may be the data values in column D of Table 2 from indices (loop back paths) 3-9. The Differential Delta Fault Pattern may be selected to include at least one nominal data point on each side thereof, e.g. a value <=0.1 dB. Data values at all other indices of column E are set to zero (indices 1, 2, 10, 11 and 12).

An LMS Current Measurement (column B of Table 2) is established and the index (loop back path) in the LMS Current Measurement where the Differential Delta Fault Pattern is to be injected (indices 3-9) is stored. For each Differential Delta Fault Pattern to be injected (Column E), a Normalized Fault Data Set (column F of Table 2) may be created by normalizing the Differential Delta Fault Pattern data to "raw" gain values of the LMS Current Measurement (e.g. in column B). Normalizing the Differential Delta Fault Pattern data to the gain values of the LMS Current Measurement may be accomplished by a variety of methods.

In the example of Table 2, normalization is performed by successively summing the Differential Delta Fault Pattern (column E) and storing each of the accumulated values as a Normalized Fault Data Set (Column F). This creates a specific normalized fault injection signature for incorporation into the LMS Current Measurement. The Normalized Fault Data Set, D(N), may be expressed as:

$$D(N)_i = \sum_{x=1}^{i} (\Delta(U_x)) \qquad \text{Equation 6}$$

where i is the data index/loop back path number, and U is the Differential Delta Fault Pattern (column E).

The Normalized Fault Data may be injected into the LMS Current Measurement to establish a new LMS baseline for the system. Injecting the Normalized Fault Data set into the LMS Current Measurement may be accomplished by modifying the LMS Current Measurement with the Normalized Fault Data Set in any deterministic manner. In the example shown in Table 2, the value of the Normalized Fault Data associated with each index (loop back path) of the Differential Delta Fault pattern (i.e. indices 1-12 in Table 2) is subtracted from the LMS Current Measurement at the corresponding index to establish a new LMS Baseline data set with an injected fault as shown in column C of Table 2. This effectively creates a new LMS Baseline including normalized mirror image of the Differential Delta Fault pattern, which when used to create a new differential delta data set with a subsequent LMS measurement will effectively inject the fault into the subsequent LMS measurement as if the previous baseline was being used with the current measurement containing the fault. Injecting the Normalized Fault Pattern (column F of Table 2), D(N) into the current LMS Current Measurement (column B of Table 2), B(V) to achieve a new LMS Baseline with an Injected Fault (column C of Table 4), C(V) can be expressed as:

$$C(V)i=B(V)i-D(N)_i \qquad \text{Equation 7}$$

where i ranges from 1 to the ending index of the Normalized Fault Pattern (e.g., indices from 1 to 12 in Table 2).

FIG. 3 includes a plot 300 of the LMS Current Measurement data set in column C of Table 1 and a plot 302 of the new LMS Baseline with an injected fault in column C of Table 2 vs. the loop back path number. As shown, the LMS Current Measurement is modified by the Normalized Fault Pattern to inject the unrepaired previous fault into the LMS Current Measurement and establish a new LMS baseline for the system. FIG. 4 includes a plot 400 of the Differential Delta Data calculated, as described in connection with Table 1, with respect to the new LMS baseline and prior to introduction of any new faults in the system. As shown, Differential Delta data calculated from the new LMS Baseline exhibits a fault pattern that is substantially the same as the fault pattern (shown in FIG. 2) exhibited in the original Differential Delta data calculated from the original LMS baseline.

Advantageously, therefore, a system and method consistent with the present disclosure involves injecting unrepaired previous faults into a new LMS baseline when re-baselining the system after a change or modification in the system. Any number of unrepaired previous faults may be injected into the new LMS baseline, and the faults may be injected in a manner that allows use of previously stored ASA fault signatures associated with the previous system configuration and baseline. Some non-limiting and non-exclusive examples of cases involving re-baselining with fault injection consistent with the present disclosure include:

1. A system includes faults (pump failures, losses, etc) and a separate break occurs, or perhaps a repeater totally fails, before the faults are repaired. The break or repeater may be repaired causing a corresponding change in line characteristics. The system may be re-baselined with the faults injected into the new baseline so that the faults that were present before break or repeater failure are kept in their correct position, and, for example, at their last known magnitudes and shape.
2. The system terminal load changed, e.g. the system is upgraded with new optical equipment, amplifier power has changed considerably, etc. The system may be re-baselined with all faults that were previously present injected into the new baseline. In this case the entire differential delta data set from the last calculation prior to the terminal load change may be injected into the new baseline.
3. The system terminal power changed causing the end points to create fault signatures. The system may be re-baselined with all faults that were previously present injected into the new baseline.
4. A branching unit is added or new fiber pairs are spliced in or brought on-line causing changes in fiber pairs, e.g. in their length. The system may be re-baselined with all faults that were previously present injected into the new baseline.

Figure 5:
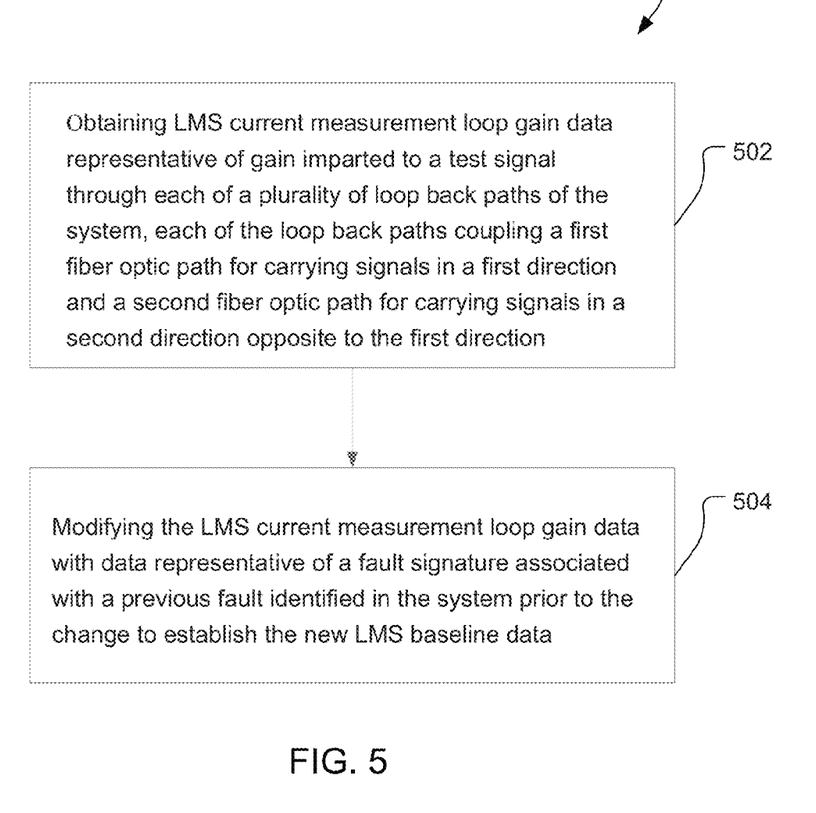
FIG. 5 is a block flow diagram illustrating one example of a process consistent with the present disclosure.

FIG. 5 is a block flow diagram of one exemplary process 500 consistent with the present disclosure. The illustrated block flow diagram includes a particular sequence of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 5, LMS current measurement loop gain data representative of gain imparted to a test signal through each of a plurality of loop back paths of the system may be obtained 502. Each of the loop back paths couples a first fiber optic path for carrying signals in a first direction and a second fiber optic path for carrying signals in a second direction opposite to the first direction. The LMS current measurement loop gain data may be modified 504 with data representative of a fault signature associated with a previous fault identified in the system prior to the change to establish the new LMS baseline data.

There is thus provided a system and method involving injection of previous faults into a new LMS baseline when re-baselining a system. According to one aspect of the disclosure, there is provided a method of establishing new line monitoring system (LMS) baseline data compared to which faults are identified in a line monitoring system of an optical communication system after a change to the system. The method includes: obtaining LMS current measurement loop gain data representative of gain imparted to a test signal through each of a plurality of loop back paths of the system, each of the loop back paths coupling a first fiber optic path for carrying signals in a first direction and a second fiber optic path for carrying signals in a second direction opposite to the first direction; and modifying the LMS current measurement loop gain data with data representative of a fault signature associated with an previous fault identified in the system prior to the change to establish the new LMS baseline data.

According to another aspect of the disclosure there is provided a method of monitoring an optical communication system comprising a plurality of loop back paths coupling a first fiber optic path for carrying signals in a first direction and a second fiber optic path for carrying signals in a second direction opposite to the first direction. The method includes transmitting a first test signal on the first fiber optic path; receiving an associated first returned test signal from each of the loop back paths from the second fiber optic path; calculating LMS baseline loop gain data associated with each of the loop back paths from the returned test signals; transmitting a second test signal on the first fiber optic path; receiving an associated second returned test signal from each of the loop back paths from the second fiber optic path; calculating LMS current measurement loop gain data associated with each of the loop back paths from the second returned test signals; identifying a fault signature corresponding to a fault in the optical communication system in response to a comparison of the LMS baseline loop gain data to the LMS current measurement loop gain data; transmitting a third test signal on the first fiber optic path after a change to the system; receiving an associated third returned test signal from each of the loop back paths from the second fiber optic path; calculating second LMS current measurement loop gain data associated with each of the loop back paths from the third returned test signals; and modifying the second LMS current measurement with data representative of the fault signature to establish new LMS baseline loop gain data for the system.

According to yet another aspect of the disclosure there is provided a line monitoring system for an optical communication system including a test signal transmitter configured to provide a test signal for transmission on an optical communication system. The optical communication system includes a first optical fiber path for receiving the test signal and carrying the test signal in a first direction, a second optical fiber path for carrying signals in a second direction opposite from the first direction, and a plurality of loop back paths, each of the loop back paths coupling a test signal from a first optical fiber path of the of the system to the second optical fiber path of the system as an associated returned test signal. A correlator is configured to modify LMS current measurement loop gain data representative of gain imparted to the test signal through each of the plurality of loop back paths with data representative of a fault signature associated with a previous fault identified in the system prior to a change in the system to establish new LMS baseline data for the system.

The embodiments that have been described herein but some of the several which utilize this invention and are set forth here by way of illustration but not of limitation. Many other embodiments, which will be readily apparent to those of ordinary skill in the art, may be made without departing materially from the spirit and scope of the invention

What is claimed is:

1. A method of re-baselining a line monitoring system (LMS) of an optical communication system after a change to the system, wherein before the change to the system the LMS was configured to use previous LMS baseline data comprising loop gain data representative of gain imparted to a first test signal through each of a plurality of loop back paths of the system, each of said loop back paths coupling a first fiber optic path for carrying signals in a first direction and a second fiber optic path for carrying signals in a second direction opposite the first direction, and wherein before the change to the system the previous LMS baseline data was used to identify a previous unrepaired fault that was not repaired before the change to the system, the method comprising:

obtaining LMS current measurement loop gain data representative of gain imparted to a second test signal through each of the plurality of loop back paths of the system after the change to the system;

modifying said LMS current measurement loop gain data by, at least in part, injecting data representative of a fault pattern of a fault signature associated with the previous unrepaired fault into said LMS current measurement loop gain data, wherein injecting data representative of a fault pattern includes subtracting at least one value representative of a gain value of said fault pattern from a corresponding gain value of said LMS current measurement loop gain data; and storing said modified LMS current measurement loop gain data as a new LMS baseline data in order to re-baseline said system.

2. A method according to claim 1, wherein said LMS current measurement loop gain data comprises differential loop gain data comprising, for each one of said loop back paths, a loop gain imparted to said second test signal through said each one of said loop back paths, minus a previous loop back path loop gain imparted to said second test signal through one of said loop back paths preceding said each one of said loop back paths.

3. A method according to claim 1, wherein said data representative of said fault signature comprises a difference between said previous LMS baseline data and previous LMS current measurement loop gain data.

4. A method according to claim 1, wherein said modifying comprises normalizing said data representative of said fault signature to said LMS current measurement loop gain data.

5. A method according to claim 1, said method further comprising identifying said previous unrepaired fault in the optical communication system in response to comparing the new LMS baseline data with subsequent LMS current measurement loop gain data.

6. A method according to claim 5, wherein said identifying comprises comparing a difference between the new LMS baseline data and said subsequent LMS current measurement loop gain data to a predetermined fault signature associated with said previous unrepaired fault.

7. A method according to claim 6, wherein said predetermined fault signature is determined in response to a difference between previous LMS baseline data obtained before said change and previous LMS current measurement loop gain data obtained before said change.

8. A method of monitoring an optical communication system comprising a plurality of loop back paths coupling a first fiber optic path for carrying signals in a first direction and a second fiber optic path for carrying signals in a second direction opposite to the first direction, the method comprising:

transmitting a first test signal on the first fiber optic path;

receiving an associated first returned test signal from each of the loop back paths from the second fiber optic path;

calculating LMS baseline loop gain data representative of gain imparted to the first test signal through each of the loop back paths from the first returned test signal;

transmitting a second test signal on the first fiber optic path;

receiving an associated second returned test signal from each of the loop back paths from the second fiber optic path;

calculating LMS current measurement loop gain data representative of gain imparted to the second test signal through each of the loop back paths from the second returned test signals;

determining a first fault signature corresponding to a fault in the optical communication system in response to a comparison of said LMS baseline loop gain data to said LMS current measurement loop gain data;

transmitting a third test signal on the first fiber optic path after a change to said system;

receiving an associated third returned test signal from each of the loop back paths from the second fiber optic path;

calculating second LMS current measurement loop gain data representative of gain imparted to the third test signal through each of the loop back paths from the third returned test signals;

modifying said second LMS current measurement loop gain data by, at least in part, injecting data representative of a fault pattern of said first fault signature into said second LMS current measurement loop gain data by subtracting at least one value representative of a gain value of said fault pattern from a corresponding gain value of said LMS current measurement loop gain data; and storing said modified second LMS current measurement loop gain data as a new LMS baseline loop gain data in order to re-baseline said system.

9. A method according to claim 8, wherein said modifying comprises normalizing said data representative of said fault signature to said second LMS current measurement loop gain data.

10. A line monitoring system for an optical communication system comprising:

a test signal transmitter configured to provide a test signal for transmission on an optical communication system, the optical communication system comprising a first optical fiber path for receiving said test signal and carrying said test signal in a first direction, a second optical fiber path for carrying signals in a second direction opposite from said first direction, and a plurality of loop back paths, each of said loop back paths coupling a test signal from a first optical fiber path of said of said system to said second optical fiber path of said system as an associated returned test signal; and a correlator configured to modify LMS current measurement loop gain data representative of gain imparted to said test signal through each of the plurality of loop back paths after a change in said system by, at least in part, injecting data representative of a fault pattern of a fault signature into said LMS current measurement loop gain data by subtracting at least one value representative of a gain value of said fault pattern from a corresponding gain value of said LMS current measurement loop gain data, said fault signature being associated with a previous unrepaired fault identified in said system prior to the change in said system, and storing said modified LMS current measurement loop gain data as new LMS baseline data in order to re-baseline said system after the change in said system, wherein said data representative of said fault signature associated with a previous unrepaired fault comprises a difference between previous LMS baseline data comprising loop gain data representative of gain imparted to a first test signal through each of a plurality of loop back paths prior to the change in said system and previous LMS current measurement loop gain data comprising loop gain data representative of gain imparted to a second test signal through each of a plurality of loop back paths prior to the change in said system.

11. A line monitoring system according to claim 10, wherein each of said loop back paths is disposed in an associated repeater coupled to said first and second fiber paths, each of said repeaters comprising a first amplifier for amplifying signals on said first optical fiber path and a second amplifier for amplifying signals on said second optical fiber path.

12. A line monitoring system according to claim 10, wherein said LMS current measurement loop gain data comprises differential loop gain data comprising, for each one of said loop back paths, a loop gain imparted to said first test signal through said each one of said loop back paths, minus a previous loop back path loop gain imparted to said first test signal through one of said loop back paths preceding said each one of said loop back paths.

13. A line monitoring system according to claim 10, wherein said data representative of said fault signature comprises a difference between previous LMS baseline data and previous LMS current measurement loop gain data.

14. A line monitoring system according to claim 10, wherein said correlator is configured to normalize said data representative of said fault signature to said LMS current measurement loop gain data.

15. A line monitoring system according to claim 10, wherein said correlator is configured to identify said previous unrepaired fault in the optical communication system in response to comparing the new LMS baseline data with subsequent LMS current measurement loop gain data.

16. A line monitoring system according to claim 15, wherein said correlator is configured to compare a difference between the new LMS baseline data and said subsequent LMS current measurement loop gain data to a predetermined fault signature associated with said previous unrepaired fault.

17. A line monitoring system according to claim 16, wherein said predetermined fault signature is determined in response to a difference between previous LMS baseline data obtained before said change and previous LMS current measurement loop gain data obtained before said change.

* * * * *